(12) United States Patent  (10) Patent No.: US 7,139,160 B2
Hidaka et al.                (45) Date of Patent:    Nov. 21, 2006

(54) ELECTRONIC COMPONENT (75) Inventors: Akio Hidaka, Miyazaki (JP); Yuichi Murano, Miyazaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 130 days.

(21) Appl. No.: 10/938,589

(22) Filed: Sep. 13, 2004

(65) Prior Publication Data

US 2005/0133240 A1    Jun. 23, 2005

(30) Foreign Application Priority Data

Dec. 18, 2003  (JP) ............................. 2003-420648
Apr. 22, 2004  (JP) ............................. 2004-126627

(51) Int. Cl.
 *H01G 4/00* (2006.01)
(52) U.S. Cl. ................................. 361/301.3; 361/306.1; 361/306.3; 361/321.2; 361/308.1; 361/540; 361/523
(58) Field of Classification Search ............. 361/306.3, 361/321.2, 311, 313, 528, 301.3, 306.1–3, 361/321.1–5, 523–525, 540
See application file for complete search history.

(56) References Cited

U.S. PATENT DOCUMENTS

| 4,617,609 A | 10/1986 | Utner et al. |
| 4,734,819 A | 3/1988 | Hernandez et al. |
| 4,748,537 A | 5/1988 | Hernandez et al. |
| 4,959,505 A | 9/1990 | Ott |
| 5,420,745 A | 5/1995 | Hidaka et al. |
| 5,466,887 A | 11/1995 | Hasegawa |
| 5,712,758 A | 1/1998 | Amano et al. |
| 5,883,780 A | 3/1999 | Noji et al. |
| 5,889,445 A | 3/1999 | Ritter et al. |
| 6,046,507 A | 4/2000 | Hatchard et al. |
| 6,191,933 B1* | 2/2001 | Ishigaki et al. ............. 361/309 |
| 6,316,726 B1 | 11/2001 | Hidaka et al. |
| 6,477,030 B1* | 11/2002 | Hidaka et al. ........... 361/301.3 |
| 6,771,485 B1* | 8/2004 | Yokoyama et al. ......... 361/309 |
| 6,781,816 B1* | 8/2004 | Togashi ................... 361/306.3 |
| 6,870,727 B1* | 3/2005 | Edson et al. ................ 361/523 |
| 6,882,521 B1* | 4/2005 | Tsutsui et al. ............. 361/523 |
| 2002/0080550 A1 | 6/2002 | Hidaka et al. |
| 2003/0087538 A1* | 5/2003 | Ueno .......................... 439/68 |

FOREIGN PATENT DOCUMENTS

| JP | 58-56431 | 4/1983 |
| JP | 61-27327 | 2/1986 |
| JP | 61-129322 | 8/1986 |
| JP | 4-59124 | 5/1992 |
| JP | 4-357806 | 12/1992 |
| JP | 5-101975 | 4/1993 |
| JP | 5-109580 | 4/1993 |
| JP | 5-109581 | 4/1993 |

(Continued)

*Primary Examiner*—Nguyen T. Ha
(74) *Attorney, Agent, or Firm*—Wenderoth, Lind & Ponack, L.L.P.

(57) ABSTRACT

An electronic component includes plural elements, a pair of terminal sections provided to each one of the elements, and a packaging material covering the elements and parts of the terminal sections. A non-conductive shielding section is provided between the terminal sections led outside the packaging material. The presence of the shielding section allows the electronic component to downsize the electronic apparatus, embody a greater density in mounting, and eliminate adverse influence to the apparatus for achieving higher performance as well as improving the durability.

33 Claims, 6 Drawing Sheets

FOREIGN PATENT DOCUMENTS

| | | |
|---|---|---|
| JP | 5-135991 | 6/1993 |
| JP | 5-299290 | 11/1993 |
| JP | 6-125236 | 5/1994 |
| JP | 6-163315 | 6/1994 |
| JP | 6-196348 | 7/1994 |
| JP | 2000-216045 | 8/2000 |
| JP | 2001-110691 | 4/2001 |
| JP | 2002-025852 | 1/2002 |
| JP | 2002-043166 | 2/2002 |
| JP | 2002-043170 | 2/2002 |
| JP | 2002-313669 | 10/2002 |

* cited by examiner

ELECTRONIC COMPONENT

FIELD OF THE INVENTION

The present invention relates to electronic components to be suitably used in electronic apparatuses such as a modem, power supply circuit, power supply of liquid crystal, DC-DC converter, power-line communication device and the like.

BACKGROUND OF THE INVENTION

Electronic apparatuses such as a modem or a power supply circuit are formed of a large number of electronic components. For instance, capacitors are often used for noise reduction or cutting a dc component.

Electronic apparatuses have been downsized and reduced their cost according to the market request, so that electronic components to be used in such apparatuses have also encountered the requests of substantial downsizing and cost reduction. Further, surface mount devices are often demanded because the automated mounting can reduce the mounting cost and save the mounting area. In parallel with the request of downsizing, contradictory requests have risen such as more sophistication, narrower dispersion of characteristics, and longer durability. In addition to the foregoing requests, LSIs equipped with multi-pins and signal lines handle more numbers of bits, so that plural electronic components should be mounted in a smaller area where narrower pitches of lines are routed, namely, a higher mounting density is needed. Many of the modems among others have a set of two lines, i.e. one for data input and the other for data output, so that two electronic components must be mounted one the lines.

However, downsizing and sophistication are the two contradictory goals, so that achievement of one goal has rejected the other goal. For instance, it has been proposed that an electronic component be packaged into a mold by packaging material such as resin in order to narrow the dispersion of performance or characteristics, or to improve the durability. However, in the case of mounting plural electronic components, since each component is molded by the covering material, the apparatus becomes bulky. Besides, since the molded component has greater dimensions, a greater space between signal lines is needed, so that the signal lines must be routed. Those reasons cause problems such as, the printed circuit board becomes bulky, line-radiation occurs, a signal delays due to the routing. As a result, the performance of the apparatus is degraded.

On the contrary, in the case of closely mounting bare electronic components, i.e. components without packaging into a mold, in order to achieve downsize and a high density mounting, problems also occur such as short between the components or cross-talk of signals due to electric field coupling. Those problems cause the electronic apparatuses to malfunction.

To overcome the forgoing problems, plural elements are packaged into molds and they are to be downsized, which results in narrower intervals between the elements, and terminals led outside the molds have an extremely narrow space therebetween, so that electrical insulating resistance between the terminals is lowered and leakage current is produced. As a result, the electronic component is damaged, which causes the apparatus to malfunction.

In the case of capacitive elements such as capacitors, electric field coupling occurs between the adjacent capacitors, and cross talk tends to occur easily, which causes noises. Those problems are critical for printed circuit boards of electronic apparatuses, many of which are equipped with a pair of lines for data input and data output.

In the case of packaging plural elements into one pack by a packaging material, the packaging material tends not to fill enough between the elements, so that a withstanding voltage between the elements lowers. When this package including plural elements undergoes a heat-cycle test, its durability becomes a problem. To overcome those problems causing lower performance, wider intervals between the elements must be reserved, which however inhibits electronic apparatuses from being downsized.

SUMMARY OF THE INVENTION

The present invention provides an electronic component comprising the following elements:
 a plurality of elements;
 a pair of terminal sections provided to the respective elements;
 a packaging material for covering the elements and a part of the terminals; and
 a non-conductive shielding section disposed between the terminal sections adjacent to each other and led outside the packaging material.

Placement of the shielding section allows achieving downsize of the electronic apparatus and high density mounting of electronic components, and also improving performance as well as durability of the apparatus.

DETAILED DESCRIPTION OF THE INVENTION

Exemplary Embodiment

An electronic component in accordance with the exemplary embodiment of the present invention is described hereinafter with reference to the accompanying drawings.

Figure 1:
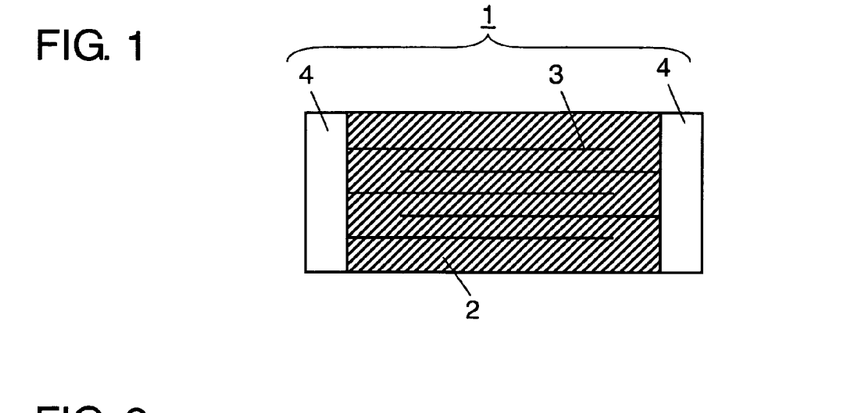
FIG. 1 shows a lateral view of a multi-layer capacitor in accordance with an exemplary embodiment of the present invention.

FIG. 1 shows multi-layer capacitor 1. Meanwhile the multi-layer capacitor is an example of elements, and the present invention can be applied to other types of capacitors, and other elements such as resistors, inductors, and filters.

As shown in FIG. 1–FIG. 4A, two multi-layer capacitors 1 are equipped with lead terminals 5, 6 respectively, and two capacitors 1 as a whole and parts of lead terminals 5, 6 are packaged into a mold by packaging material 8. Parts of respective lead terminals 5, 6 led outside the mold are called mounting section 5a, 6a that are used for being mounted to a printed circuit board.

Figure 4A:
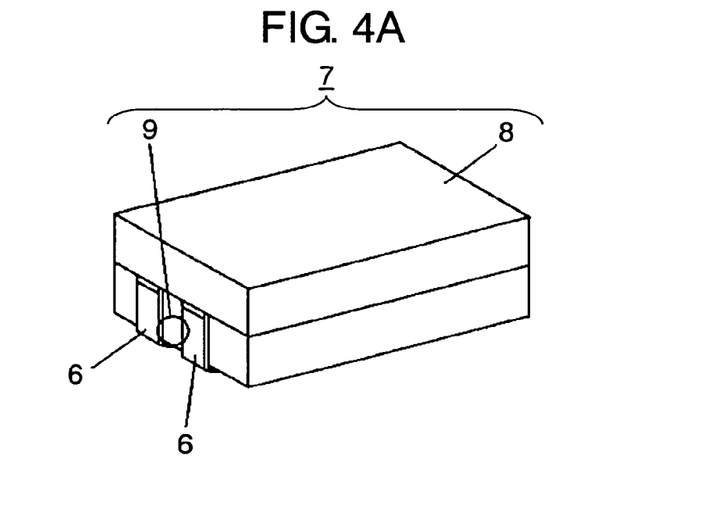
FIG. 4A shows a perspective view of an electronic component in accordance with an exemplary embodiment of the present invention.

There is a space between lead terminals 5 adjacent to each other, this space is called terminal distance expanding section 9, which is also available between lead terminals 6 adjacent to each other. Setting a distance of terminal distance expanding section 9 at not less than 0.5 mm can inhibit a leakage current from occurring in terminal distance expanding section 9.

This structure allows electronic component 7 with four terminals to be mounted to two-lines at one time, so that the component can be downsized. This structure also shortens the mounting process, reduces the mounting cost as well as the mounting area, and at the same time, adverse influences to the electronic apparatus can be avoided.

Respective sections of the electronic component are detailed hereinafter. First, multi-layer capacitor 1 is demonstrated with reference to FIG. 1. Dielectric base 2 is made of dielectric material such as titanium oxide, barium titanate, or aluminum oxide, and forms a necessary shape and size.

Interior electrode 3 is buried inside dielectric base 2, and is made of metal including at least one of Ni, Ag, Pd, Cu, Au. Use of Ni, or Ni alloy, among others, is to the advantage of cost. The surface of interior electrode 3 can be plated with the foregoing metal or alloy of them. A thickness of electrode 3 is preferably 1–5 µm, and an interval between electrodes 3 adjacent to each other is preferably not less than 15 µm.

Interior electrodes 3 are electrically coupled to terminal sections 4. Interior electrodes 3 coupled to only first terminal section 4 confront interior electrodes 3 coupled to only second terminal section 4, and majority of the capacitance is produced between those interior electrodes 3 confronting each other.

Terminal sections 4 are often disposed at both ends of dielectric base 2; however, they can be disposed other places than both the ends. For instance, terminal sections 4 are disposed on and beneath dielectric base 2, and coupled to lead terminals 5, 6. Terminal sections 4 are made of material including at least one of Cu, Zn, Ni, Ag, Au, and the surface thereof can be plated in a single layer or multi-layers.

Terminal section 4 can be formed by coupling a metal cap to dielectric base 2. Further, the outer most section of terminal section 4 is preferably made of conductive material having a melting point not less than 200° C. The structure discussed above allows terminal sections 4 to be free from thermal damage even if electronic component 7 undergoes a high temperature in reflow-soldering, so that stable reflow characteristics can be obtained.

Next, a method of manufacturing multi-layer capacitor 1 is specifically described hereinafter. First, prepare a plurality of dielectric sheets on which first face interior electrode 3 is applied and formed. Then laminate those sheets such that electrodes do not touch with each other, and form terminals sections 4 on both ends of the laminated unit. Multi-layer capacitor 1 thus formed has the following dimensions:

$3.0 \text{ mm} \leq L1 \leq 5.5 \text{ mm}$ $0.5 \text{ mm} \leq L2 \leq 2.5 \text{ mm}$ $1.5 \text{ mm} \leq L3 \leq 3.5 \text{ mm}$ where L1 is length, L2 is height, and L3 is width.

Capacitor 1 can be greater than the above one.

Smaller values of L1–L3 than the foregoing lower limit values will make the space insufficient for forming interior electrodes 3, and the number of electrodes 3 must be reduced. As a result, it is difficult to obtain a large capacitance, so that electronic components having a wide range of capacities are not obtainable.

Figure 3:
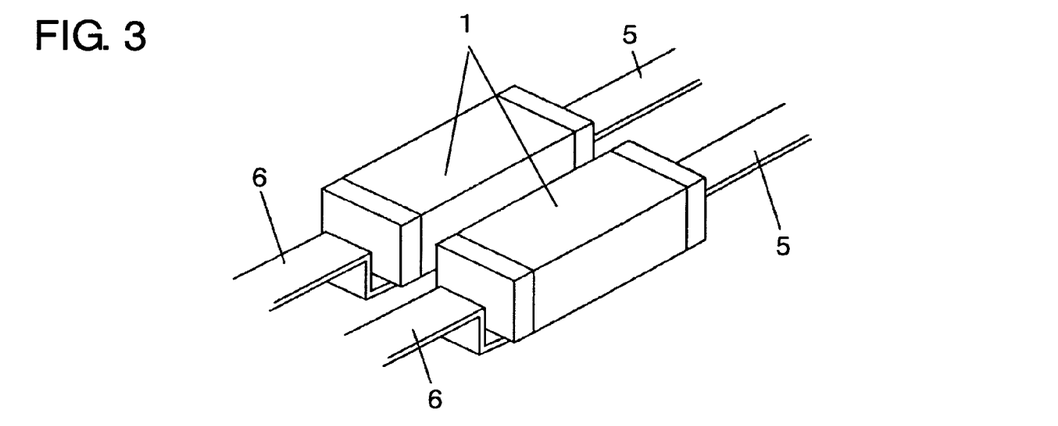
FIG. 3 shows a perspective view illustrating a placement of the multi-layer capacitor in accordance with an exemplary embodiment of the present invention.

The plural capacitors 1 can have different capacities respectively. For instance, they are mounted to a pair-line of input line and output line of a modem or a communication module using a power line, if respective lines require different capacities, capacitors 1 having different capacities are suitable for this case. FIG. 3 shows an instance where two capacitors 1 are used; however, three or more than three capacitors can be used. The elements to be packaged into a mold can be multi-layer capacitors and ordinary capacitors mixed with each other, or capacitors and inductors mixed with each other.

Figure 2:
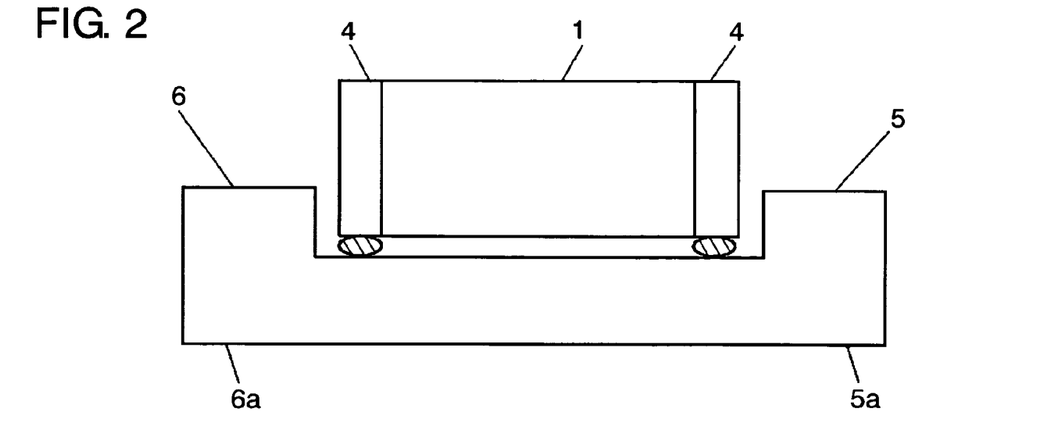
FIG. 2 shows connections of the multi-layer capacitor in accordance with an exemplary embodiment of the present invention.

Next, lead terminals 5 and 6 are described hereinafter. As shown in FIGS. 2 and 3, lead terminals 5 and 6 are coupled to terminal sections 4 of multi-layer capacitor 1, and led outside of capacitor 1. Thus even after capacitor 1 is molded by packaging material 8, the lead terminals ready to be electrically coupled to others can be led outside packaging material 8. Mounting of the electronic component onto a printed circuit board via lead terminals 5, 6 allows capacitor 1 and other elements molded inside the component to be electrically coupled to an outer circuit.

Lead terminals 5 and 6 are made of at least one metal selected from the group consisting of Fe, Cu, Ni. Use of one of those materials gives the lead terminals an advantage of electrical characteristics or processability. The lead terminal can be made of alloy of the foregoing metals. The surface of the lead terminal can be plated with the foregoing metal or alloy of them in a single layer or multi layers.

Figure 4B:
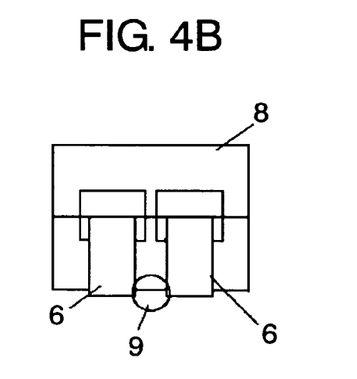
FIG. 4B shows a front view of the electronic component in accordance with an exemplary embodiment of the present invention.
Figure 4C:
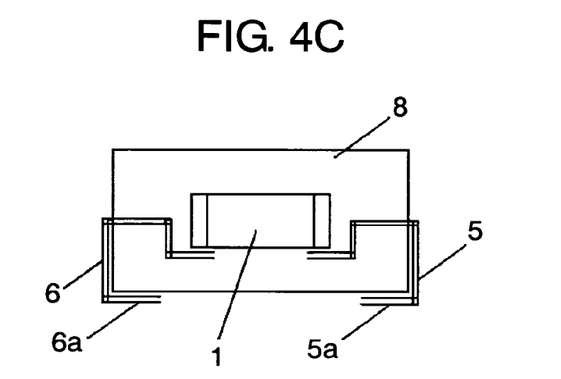
FIG. 4C shows a lateral view of the electronic component in accordance with an exemplary embodiment of the present invention.

Lead terminals 5 and 6 include respectively a junction for coupling the lead terminal to terminal section 4, an extension extending outward of packaging material 8, and mounting sections 5a, 6a to be bent at some midpoint for being mounted to a printed circuit board. As shown in FIG. 4C, mounting sections 5a, 6a can be bent to become closer to each other, or, on the contrary, to become apart from each other, i.e. to form gull wing lead. The junction where terminal section 4 is coupled to lead terminals 5 or 6 is preferably made of junction material having a melting point not lower than 200° C. This structure allows the junction to be free from thermal influence in reflow-soldering when electronic component 7 is mounted to a printed circuit board, so that deterioration in characteristics can be prevented.

In the case of terminal sections 4 prepared on and beneath dielectric base 2 instead of on both the sides, lead terminals 5, 6 are accordingly coupled to upper and lower terminal sections 4 alternately, then lead terminals 5, 6 can be led outside packaging material 8.

Lead terminals 5, 6 are led outside of packaging material 8 at the faces confronting each other, thereby widening the interval between lead terminal 5 and lead terminal 6. This structure results in better balance after the mounting.

As shown in FIG. 3, in order to package two multi-layer capacitors 1 into one mold, lead terminals 5, 6 are coupled to respective capacitors 1. Following this manner, three or more than three multi-layer capacitors 1 can be packaged into one mold, or other elements than the multi-layer capacitor can be used.

Parasitic capacity produced between lead terminals 5 or between lead terminals 6 preferably falls within the range of 0.1 pF–5.0 pF. A parasitic capacity greater than 5.0 pF causes greater dispersion of capacities when electronic components 7 are manufactured, and a parasitic capacity smaller than 0.1 pF makes it difficult to manufacture the components. The lead terminal can be trimmed when necessary for changing the area, thereby adjusting the parasitic capacity after the electronic components have been produced.

If lead terminal 5 shapes like terminal 6, the number of components can be reduced, which improves the productivity. A similar shape of lead terminals 5 and 6 to each other also allows leading out terminals 5 and 6 from approx, the same height of packaging material 8 with approx, the same length, so that symmetrical electronic components can be manufactured.

Next, packaging material 8 is described hereinafter. As shown in FIGS. 4A–4C, two multi-layer capacitors 1 are packaged into one mold, in which capacitors 1 and parts of lead terminals 5, 6 are molded by packaging material 8, thereby completing electronic component 7. Component 7 generally shapes like rectangular; however, chamfering respective sides or corners will improve anti-shock properties. Leading out terminals 5, 6 outside the mold allows component 7 to be mounted on a printed circuit board.

Packaging material 8 is made of epoxy resin excellent in electrical insulating properties, such as cresol novolac epoxy resin, biphenyl epoxy resin, or dicyclopentadiene epoxy resin.

The minimum clearance between the surface of packaging material 8 and the surface of capacitor 1, i.e. the thinnest coating thickness, can be set at not less than 0.1 mm, thereby increasing the withstanding voltage.

A thickness of packaging material 8 at the section, where lead terminals 5, 6 are led out, is prepared thicker than other sections, so that the root of leading out sections of lead terminals 5, 6 can be strengthened. This structure prevents lead terminals 5, 6 from bending, or takes preventive measures with ease against outside water entering therein.

A method of manufacturing electronic components 7 is demonstrated hereinafter. First, produce an element by coupling lead terminals 5, 6 to multi-layer capacitor 1, and then prepare two elements in parallel for packaging them with resin by a molding machine, and coat capacitors 1 and parts of lead terminals 5, 6 with packaging material 8. Next, bend the led-out portion of lead terminals 5, 6 from packaging material 8 as shown in FIG. 4C, thereby completing electronic component 7.

Next, terminal distance expanding section 9 is detailed hereinafter. Plural lead terminals 5 or plural lead terminals 6 are led outside packaging material 8, in this state a space between adjacent lead terminals 5 or adjacent lead terminals 6 is called terminal distance expanding section 9 (hereinafter simply referred to as expanding section 9). FIGS. 4A–4C show an example where two multi-layer capacitors 1 are placed in parallel, and expanding section 9 corresponds to the space sandwiched by two lead terminals 6 in FIG. 4B. In this exemplary embodiment, electronic component 7 molded by packaging material 8 has two expanding sections 9, namely, one is between lead terminals 5 and the other is between lead terminals 6.

A space between adjacent lead terminals having expanding section 9 in between preferably falls within 0.5 mm–5 mm. The space not smaller than 0.5 mm prevents the occurrence of leakage current or lowering of electrical insulating resistance between the lead terminals led out, and also prevents the occurrence of shorts between lines when the component is mounted, so that no adverse influence to the apparatus occurs. On the other hand, the space greater than 5 mm widens the interval between the elements, so that the component is hard to be downsized; however, the space greater than 5 mm can be accepted depending on a specification.

Figure 5:
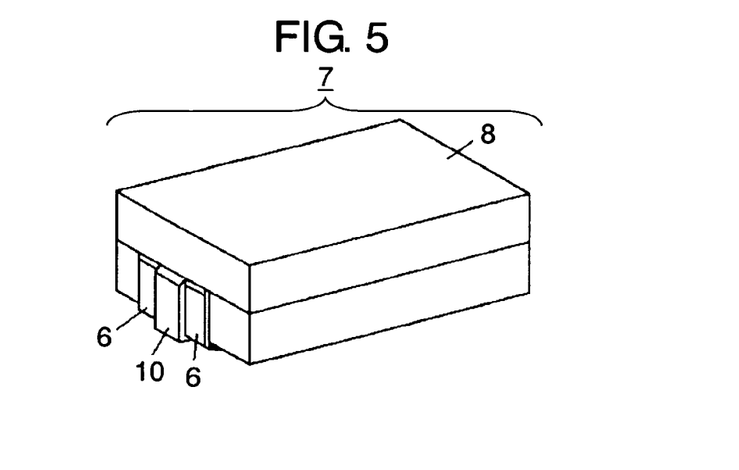
FIGS. 5, 6 and 7 show perspective views of an electronic component in accordance with and exemplary embodiment of the present invention.
Figure 6:
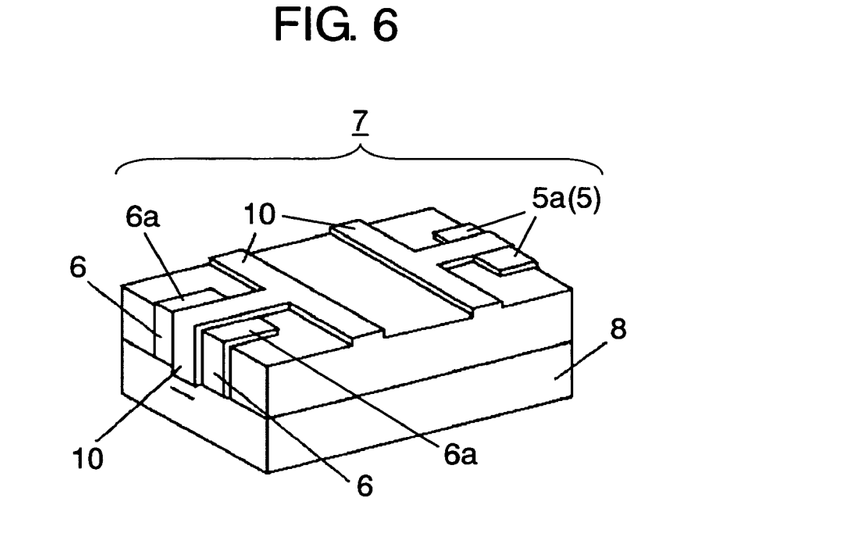

Next, a shielding section disposed at terminal distance expanding section 9 is described hereinafter with reference to FIGS. 5 and 6. Shielding section 10 is disposed at terminal distance expanding section 9, and prevents the occurrence of leakage current between the lead terminals. As shown in FIGS. 5 and 6, shielding section 10 can be a projected portion of packaging material 8, or can be formed of non-conductive insulating material independently of packaging material 8, and bonded to or engaged with casing 8. Integral molding with packaging material 8 is preferable because it can reduce the number of manufacturing steps. In the case of forming shielding section 10 separately from casing 8, the separated shielding section 10 can be bonded to casing 8 with bonding resin. An exposed face of shielding section 10 can be coated with silicone rubber.

FIG. 6 is a perspective view showing the bottom face of electronic component 7. As shown in FIG. 6, shielding section 10 is preferably formed at expanding section 9 across the led-out portion of terminals 5, 6. Because this structure can prevent leakage current from occurring at terminals 5 adjacent to each other or at terminals 6 adjacent to each other when adjacent lead terminals are formed as shown in FIG. 6.

A thickness (projection height) of shielding section 10 is preferably thicker than the thickness of lead terminals 5, 6 led outside packaging material 8. This structure positively prevents the occurrence of leakage current between adjacent terminals 5 or adjacent terminals 6, or positively prevents the lowering of insulation resistance. It is more preferable that shielding section 10 has a thickness thicker than the lead terminal by not less than 0.2 mm. This surplus thickness of not less than 0.2 mm allows positively preventing the occurrence of leakage current. This will be discussed later with reference to an experiment result.

FIG. 6 illustrates the case where mounting sections 5a, 6a of lead terminals 5, 6 are formed on the bottom face of electronic component 7, and shielding section is thicker than lead terminals 5, 6. In this case, a height is prepared on the mounting land of the printed circuit board for canceling this difference in thickness, so that component 7 having shielding section 10 on the bottom face can be mounted.

Figure 7:
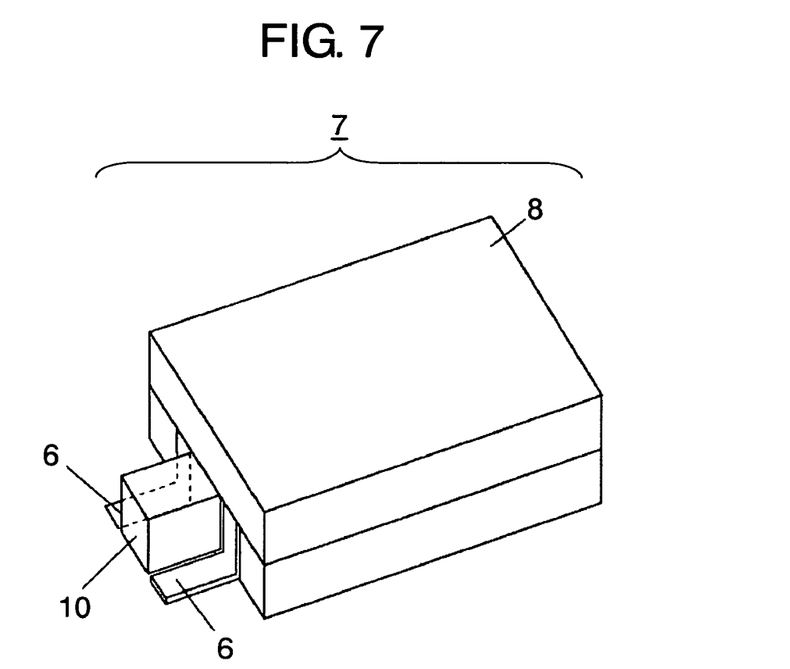

If lead terminals 5, 6 are bent outward, and mounting sections 5a, 6a are placed not on the bottom face but on other places of the electronic component, shielding section 10 is preferably projected by a greater amount than the lead terminals. FIG. 7 illustrates the foregoing case using lead terminals 6. Since terminals 6 are bent outward of the component, two terminals 6 extend outward adjacently. In such a case, shielding section 10 has a thickness enough to shield up to the tips of lead terminals 6. Shielding section 10 having a predetermined thickness can be integrally molded with packaging material 8, or formed independently of casing 8 and bonded to or engaged with casing 8.

As discussed above, shielding section 10 made of electrical insulating material is disposed between lead terminals 5 adjacent to each other or lead terminals 6 adjacent to each other such that shielding section 10 covers the whole area of adjacent terminals 5 or terminals 6. This structure prevents the occurrence of leakage current between the lead terminals, or prevents the lowering of insulation resistance.

As shown in FIG. 7, since lead terminals 5, 6 are not formed on the bottom face of component 7, shielding section 10 is not needed on the bottom face. Thus an additional height on the mounting land or additional soldering for canceling a gap between the lead terminals and the lines to be coupled to the terminals is not needed.

Next, terminal distance expanding section 9 between lead terminals 5 or between lead terminals 6 is widened for preventing the occurrence of leakage current or the lowering of electrical insulating resistance. This structure is demonstrated hereinafter.

Figure 8:
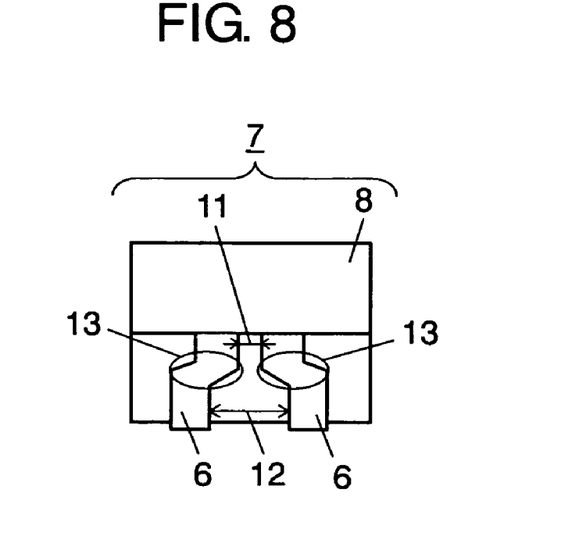
FIGS. 8 and 9 show front views of the electronic component in accordance with an exemplary embodiment of the present invention.

FIG. 8 illustrates electronic component 7 of which adjacent lead terminals 6 are set apart from each other, so that the space between sections set apart is wider than the space between the root sections. Comparison of space 11 between adjacent lead terminals 6 at the root section with space 12 between mounting sections tells that space 12 is greater than space 11 as shown in FIG. 7. In other words, a distance between adjacent terminals 6 is reserved enough in major part of lead terminals 6 for preventing the occurrence of leakage current or other inconveniences. This structure allows reserving a space between adjacent lead terminals 5, or adjacent lead terminals 6 wider enough than the space between multi-layer capacitors 1 packaged in packaging material 8. As a result, the terminal distance expanding section 9 can be advantageously widened without upsizing component 7. To achieve the foregoing structure, bent sections 13 is prepared on lead terminals 5, 6. Bent sections 13 can be formed by bending terminals 5, 6 in a three-dimensional way, or by cutting out parts of terminals 5, 6 in a second-dimensional way.

Figure 9:
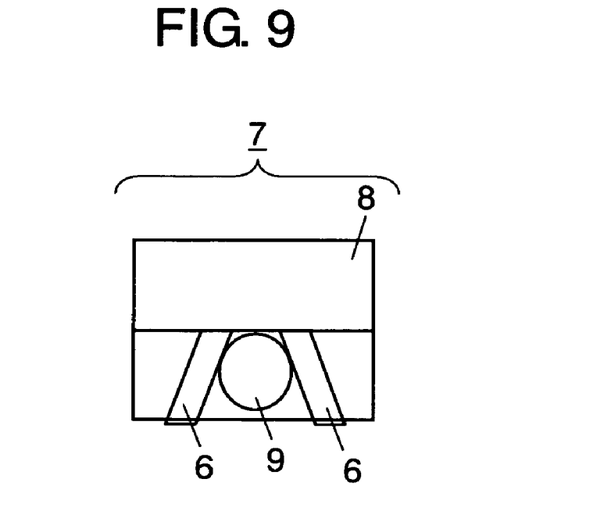

As shown in FIG. 9, lead terminals 5 or 6 can be led outside packaging material 8 expanding the distance in between. In other words, lead terminals 5 or 6 spread out from the root toward the mounting face, thereby gradually expanding terminal distance expanding section 9. This structure allows reserving a space between adjacent terminals 5 or 6 at major portion thereof enough for preventing the occurrence of leakage current, or preventing the lowering of insulation resistance.

Shielding sections 10 shown in FIG. 5–FIG. 7 can be formed at terminal distance expanding section 9 which is spread out as discussed above, i.e. by providing terminals 5, 6 with a bent section, or by leading out terminals 5, 6 to spread out from the root toward the mounting face. This structure allows more positive prevention of leakage current. In this case, shielding section 10 can be formed in accordance with the shape of terminal distance expanding section 9, or a given shape such as a rectangular solid regardless of the shape of terminal distance expanding section 9.

Next, advantages over the prior art of electronic component 7 in accordance with the exemplary embodiment of the present invention is described hereinafter based on an experiment.

Figure 10A:
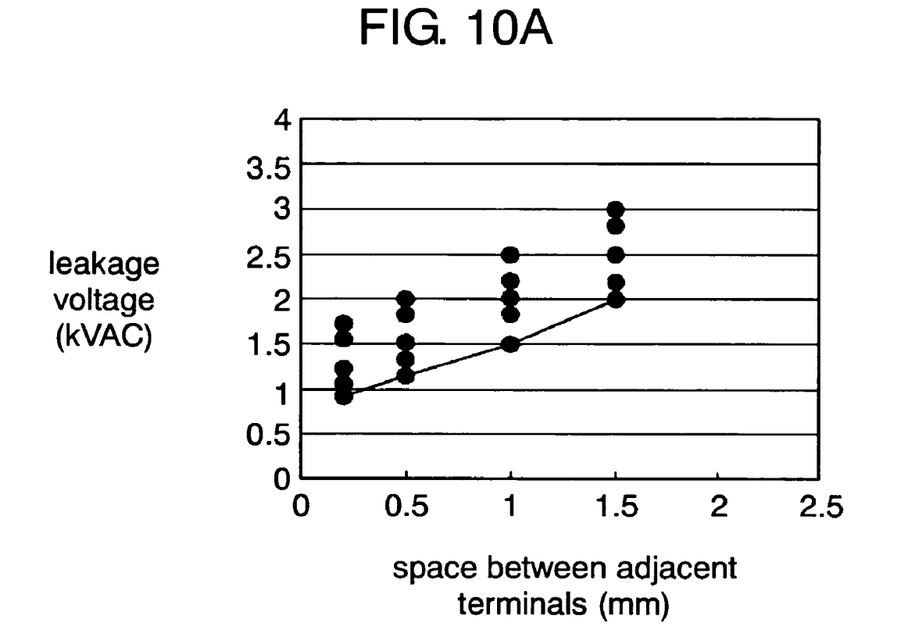
FIG. 10A shows a graph illustrating a relation between a leakage voltage and a space between adjacent terminals based on an experiment in accordance with an exemplary embodiment of the present invention.

FIG. 10A shows a graph illustrating a relation of a distance between adjacent lead terminals vs. an electrical breakdown value based on the experiment. Axis X represents a distance between adjacent lead terminals, and axis Y represents a voltage which generates leakage current causing the breakdown of an electronic component.

An electronic component in general needs a withstanding voltage of not less than 1 kVAC to suppress the leakage current, and the graph tells that the distance between adjacent terminals over 0.5 mm can reserve this value. A distance shorter than 0.5 mm generates leakage current before the voltage reaches 1 kVAC. Thus the distance does not yet have a sufficient withstanding voltage.

The experiment proves that the distance not shorter than 0.5 mm between adjacent lead terminals 5 or 6 positively prevents the leakage current from occurring or the insulation resistance from lowering.

Figure 10B:
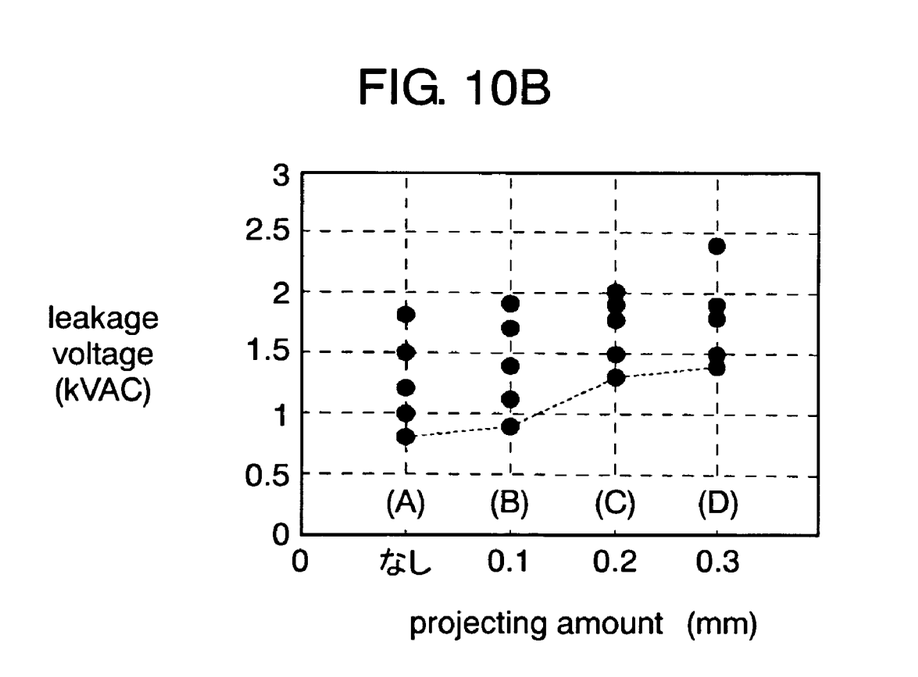
FIG. 10B shows a graph illustrating a relation between a shielding section and a leakage current between the terminals based on an experiment in accordance with an exemplary embodiment of the present invention.

FIG. 10B shows a comparison of a projecting amount of shielding section 10 vs. a voltage generating the leakage current. The comparison is measured in the following condition: distance between adjacent lead terminals=0.2 mm; no shielding section 10 is formed; and shielding section 10 having different projecting amounts are formed. To be more specific, the following four cases are measured: (A) no shielding section 10 is formed, (B) projecting amount of shielding section 10 is greater by 0.1 mm than the thickness of lead terminal led out, (C) projecting amount is greater by 0.2 mm than the thickness of lead terminal led out, and (D) projecting amount is greater by 0.3 mm.

As shown in FIG. 10B, in the case of (A), the withstanding voltage that generates the leakage current is substantially lower than 1 kVAC, so that the withstanding voltage between the lead terminals is not sufficient when no shielding section 10 is formed. On the other hand, when shielding section 10 is formed, the withstanding voltage is approx. 1 kVAC in the case where projecting amount is greater by 0.1 mm than the thickness of lead terminals led outside the packaging material. In the case where projecting amount is greater by 0.2 mm, the withstanding voltage is substantially higher than 1 kVAC. And the increment of the leak voltage becomes moderate when the projecting amount becomes greater by 0.3 mm and onward. This experiment proves that the projecting amount greater by 0.2 mm than the thickness of lead terminal led outside the packaging material is sufficient.

The experiment also proves the placement of shielding section 10 allows reserving a sufficient withstanding voltage between the lead terminals even if the distance therebetween is very narrow. When the projecting amount is greater by 0.2 mm, in particular, an explicit advantage of this structure can be expected. Since the presence of shielding section 10 allows reserving a withstanding voltage against the leakage current, the space between the lead terminals and the space between multi-layer capacitors 1 packaged by packaging material 8 into one mold can be narrowed, thereby substantially downsizing electronic component 7. If shielding section 10 has a thickness greater by 0.2 mm than the thickness of lead terminals led outside packaging material 8, substantial shielding effect between the lead terminals can be obtained.

Figure 11A:
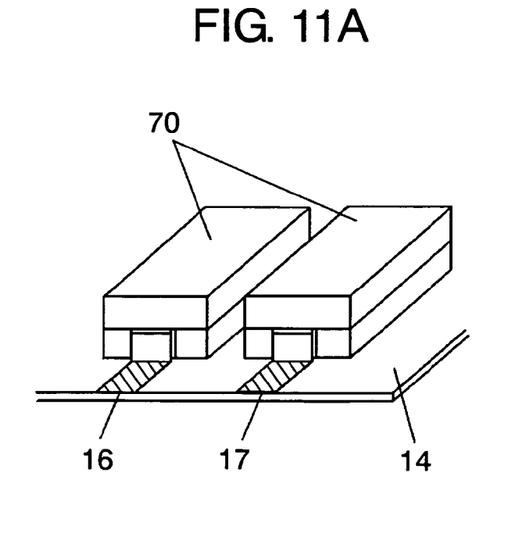
FIG. 11A shows a conventional electronic component mounted.
Figure 11B:
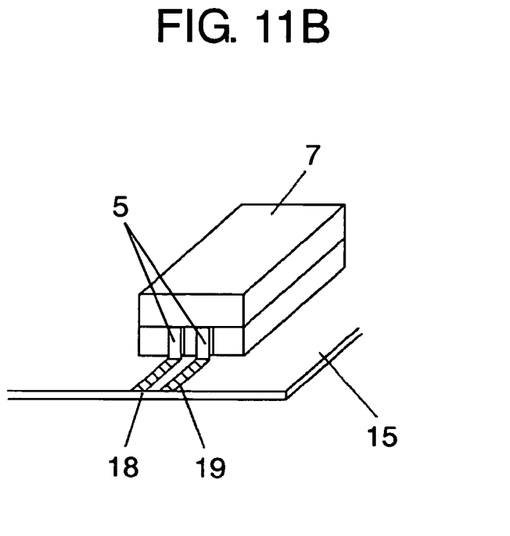
FIG. 11B shows a mounted state of an electronic component in accordance with an exemplary embodiment of the present invention.

Next, downsize of electronic component 7 and space-saving of mounting area are described hereinafter with reference to FIGS. 11A and 11B. FIG. 11B shows a state where an electronic component including two elements packaged into one mold is mounted on printed circuit board 15 in accordance with the exemplary embodiment of the present invention. FIG. 11A shows a state, for comparison purpose, where two electronic components including one element molded respectively are mounted on printed circuit board 14. In a modem or a module for communication using a power line, an electronic component, in which multi-layer capacitors or other types of capacitors are molded, is mounted for noise reduction to the respective lines of two-wire system, i.e. one for output data and the other for input data.

As shown in FIG. 11A, a single element is molded into electronic component 70 in a conventional manner, so that mounting steps should be repeated twice, and since respective components are molded, the components become bulky, which needs a large mounting area. A wide space between lines 16 and 17 should be reserved in accordance with the space between adjacent lead terminals of component 70. Those factors enlarge the mounting area and accompany the routing of lines.

As shown in FIG. 11B, on the other hand, two elements packaged into one mold allows reducing the mounting area, and since the space between adjacent lead terminals 5 or 6 becomes narrower, the space between lines 18 and 19 can be narrowed, so that the mounting space can be further reduced. The routing of lines is not needed, so that line radiation due to the routings or adverse influence to other components mounted can be advantageously avoided. Besides, only one mounting step can achieve the mounting of component 7 onto the lines, thereby reducing the mounting cost.

In this case, at least one of the following three structures is preferably prepared so that a withstanding voltage enough for suppressing the leakage current between the lead terminals can be obtained: (1) the distance between adjacent lead terminals is not less than 0.5 mm, (2) shielding section 10 is disposed between the adjacent lead terminals, and (3) bent section 13 is disposed for reserving a sufficient distance between the adjacent lead terminals. As a result, no breakdown in the elements or no malfunction in the apparatus occurs.

When three or more than three elements are packaged into one mold to form electronic component 7, a similar advantage can be produced.

In this embodiment as shown in FIG. 1–FIG. 3, multi-layer capacitors 1 are handled as an element of an electronic component, and each capacitor 1 has a pair of terminal sections 4 on single base 2.

Next, with reference to FIGS. 12 and 13, a packaged electronic component including element of multi-layer capacitor 1, in which plural pairs of terminal sections 4 are formed on single base 2, is demonstrated hereinafter.

For instance, plural pairs of terminal sections 4 are disposed on both end-faces of base 2 made of ceramic such as aluminum oxide. This construction allows a single packaged element to include plural electrical elements such as capacitors or multi-layer capacitors.

In the case of using multi-layer capacitor 1 as an element, interior electrodes 3 in the base are separated corresponding to each pair of terminal sections 4, and they are coupled to corresponding terminal sections 4. This structure allows plural multi-layer capacitors 1 arranged in parallel to form a single element. Other electrical elements such as a single-plate capacitor, resistor, inductor, can be disposed in parallel in a single base, so that respective elements are coupled to corresponding terminal sections 4. This construction allows a single packaged element to work as plural electrical elements.

Using the element such as multi-layer capacitor 1 formed of single element makes the manufacturing of the element easy. In other words, electronic component 7 can be manufactured with ease, and downsize of component 7 can be advantageously further promoted.

Figure 12:
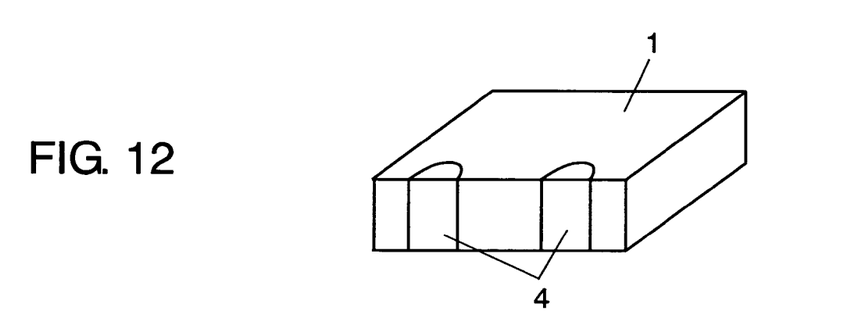
FIGS. 12 and 13 show perspective views of a multi-layer capacitor in accordance with an exemplary embodiment of the present invention.
Figure 13:
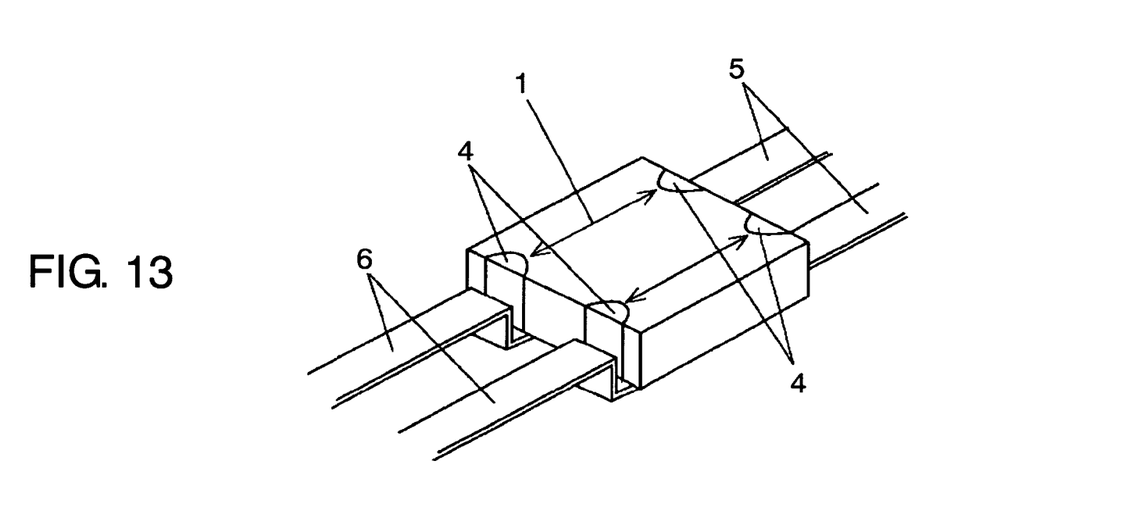

FIGS. 12 and 13 show an instance of element 1 having two pairs of terminal sections 4; however, element 1 can include three or more than three pairs of terminal sections 4. The number of terminals can be determined appropriately in accordance with a specification. Each one of elements 1 shown in FIGS. 12 and 13 can be put in packaging material 8 independently, or plural elements 1 shown in FIGS. 12 and 13 can be put in bulk in packaging material 8.

Next, lead terminals 5, 6 of multi-layer capacitor 1 having plural pairs of terminal sections 4 at a single base are described. In this case, as shown in FIGS. 2 and 3, lead terminals 5, 6 are coupled to terminal sections 4 of capacitor 1, so that terminals 5, 6 are ready to be led outside capacitor 1. As shown in FIG. 3, two multi-layer capacitors 1 are ready to be packaged into one mold, so that lead terminals 5, 6 are coupled to respective capacitors 1 independently. On the other hand, as shown in FIG. 13, multi-layer capacitor 1 formed of the single-base and two pairs of terminal sections 4 disposed on the single base. In other words, four lead terminals 5, 6 in total can be led outside the single base.

In the case of the multi-layer capacitor having two pairs of terminal sections at its single base, at least one of the following three structures is preferably prepared so that a withstanding voltage enough for suppressing leakage current between the lead terminals can be obtained: (1) the distance between adjacent lead terminals is not less than 0.5 mm, (2) shielding section 10 is disposed between the adjacent lead terminals, and (3) bent section 13 is disposed for reserving a sufficient distance between the adjacent lead terminals.

The foregoing embodiment proves that the present invention can positively and efficiently prevent the withstanding voltage from lowering caused by a narrower distance between adjacent lead terminals. This advantage of the present invention is particularly effective to provide an electronic component including plural elements packaged by a packaging material into one mold in order to downsize the electronic component or reduce its mounting area. The present invention thus allows the downsize of electronic components and the reduction of mounting area through packaging plural elements by a packaging material into one mold free from degrading the durability of the components. The present invention also allows reducing the mounting steps as well as the mounting cost. Those advantages can be embodied by a so simple structure that no cost increase is expected.

In the case of packaging an inductor, a capacitor and others together into one mold to form a composite component, the concept of the present invention can be used. The structures and advantages discussed above are particularly useful to the electronic components requiring a high withstanding voltage.

This exemplary embodiment refers to a multi-layer capacitor as an element; however, an applicable element is not limited to the multi-layer capacitor. A regular capacitor, a resistor, an inductance, and a filter can be used as an element.

Talking about the terminal, a part of a lead terminal coupled to the multi-layer capacitor can be led outside the packaging material and can work as a terminal, or a part of a terminal coupled to the element in advance can be led outside the packaging material and can work as a terminal.

The following points are advantages of the electronic component in accordance with this exemplary embodiment of the present invention:

Plural elements, multi-layer capacitors among others, are packaged by a packaging material into one mold, and the lead terminals are led outside the packaging material, so that plural components can be mounted at a time. The steps of mounting can be reduced and the mounting cost can be lowered.

Since plural elements are packed in one packaging material, it requires a smaller mounting area than individual components are mounted, so that the electronic apparatus can be downsized. Intervals between lines on a printed circuit board can be narrowed, so that an upsize of the board due to extra routings of the lines can be avoided, which prevents the performance from lowering caused by the line radiation.

The structure discussed above also can overcome the following problems:

degradation of performance as well as durability due to an insufficient withstanding voltage or an electric field coupling between elements, those occurring when elements are mounted individually with narrow intervals.

The electronic component molded by the packaging material obtains durability excellent in environmental changes, and increases shock resistance, thereby extending a service life of the electronic apparatus.

The space between adjacent lead terminals led outside the packaging material is specified at not narrower than a given length. This preparation prevents leakage voltage or degradation of insulation between the lead terminals, and also obtains a withstanding voltage that is needed for mounting the component to the apparatus.

A projection is provided to the packaging material between adjacent terminals led outside the packaging material in order to form a shielding section, or an external member is coupled between the adjacent terminals to form the shielding section. This structure positively insulates the adjacent terminals, thereby preventing leakage voltage from occurring or electrical insulating resistance from lowering. As a result, the withstanding voltage that is needed for mounting the component to the apparatus can be obtained.

When an element to be packaged in a mold is a capacitor requiring a high withstanding voltage, a large amount of current sometimes shorts out due to leakage current, so that the electronic apparatus malfunctions. However, the structure discussed above can avoid this problem.

The foregoing advantages can achieve downsizing the electronic apparatus and extending the service life of the apparatus.

INDUSTRIAL APPLICABILITY

The present invention provides an electronic component comprising plural elements, a pair of terminal sections provided to each one of the plural elements, and a packaging material for covering the elements and parts of the terminal sections. A shielding section made of non-conductive and electrical insulating material is disposed between the terminal sections led outside the packaging material. This structure allows mounting plural electronic components at a time. This electronic component can be used in applications where a fewer mounting steps, lower mounting cost is required, or leakage current between the terminals should be prevented.

What is claimed is:

1. An electronic component comprising:
   a plurality of elements;
   a pair of terminal sections provided to each one of the elements;
   a packaging material covering the elements and a part of the terminal sections,
   wherein a non-conductive shielding section is provided between the terminal sections adjacent to each other and led outside the packaging material.

2. The electronic component of claim 1, wherein the shielding section is a part of the packaging material and is a projection protruded from the packaging material between the terminal sections adjacent to each other.

3. The electronic component of claim 2, wherein the projection protrudes by a greater amount than a projecting amount of the terminal sections led outside the packaging material.

4. The electronic component of claim 2, wherein the projection has a greater thickness than a thickness of the terminal sections led outside the packaging material.

5. The electronic component of claim 2, wherein the projection has a thickness greater by not less than 0.2 mm than a thickness of the terminal sections led outside the packaging material.

6. The electronic component of claim 1, wherein the shielding section is an electrical insulating member provided on the packaging material between the terminal sections adjacent to each other.

7. The electronic component of claim 6, wherein the electrical insulating member has a greater thickness than a projecting amount of the terminal sections led outside the packaging material.

8. The electronic component of claim 6, wherein the electrical insulating member has a greater thickness than a thickness of the terminal sections led outside the packaging material.

9. The electronic component of claim 6, wherein the electrical insulating member is thicker by not less than 0.2 mm than a thickness of the terminal sections led outside the packaging material.

10. The electronic component of claim 1,
    wherein at least one element of the elements is a multi-layer capacitor including a dielectric base in which an interior electrode is buried, and
    wherein the pair of terminal sections is provided to the dielectric base.

11. The electronic component of claim 1, wherein each one of the elements covered with the packaging material comprises a single base having a plurality of pairs of terminal sections.

12. The electronic component of claim 11, wherein one piece of the element comprising the single base having the plurality of pairs of terminal sections is packed in the packaging material.

13. An electronic component comprising:
    a plurality of elements;
    a pair of terminal sections provided to each one of the elements;
    a packaging material covering the elements and a part of terminal sections,
    wherein the electronic component includes a terminal distance expanding section that expands a space between terminals adjacent to each other of the terminal sections led outside the packaging material.

14. The electronic component of claim 13, wherein the terminal distance expanding section has a longer space between the terminals adjacent to each other of the terminal sections than a space between the terminal sections at a place led outside the packaging material.

15. The electronic component of claim 13, wherein the terminal distance expanding section is a bent section provided to the terminal sections led outside the packaging material.

16. The electronic component of claim 13, wherein a space between the terminals adjacent to each other of the terminal sections led outside of the packaging material is not smaller than 0.5 mm and not greater than 5 mm.

17. An electronic component comprising:
a plurality of multi-layer capacitors, each of the capacitors including:
a dielectric base in which an interior electrode is buried;
a pair of terminal sections provided to the dielectric base;
a pair of lead terminals coupled to the pair of the terminal sections; and
a packaging material covering the plurality of multi-layer capacitors and a part of the lead terminals,
wherein a non-conductive shielding section is provided between the lead terminals adjacent to each other and led outside the packaging material.

18. The electronic component of claim 17, wherein the shielding section is a part of the packaging material and a projection protruded from the packaging material between the lead terminals adjacent to each other.

19. The electronic component of claim 18, wherein the projection protrudes by a greater amount than a projecting amount of the lead terminals led outside the packaging material.

20. The electronic component of claim 18, wherein the projection has a greater thickness than a thickness of the lead terminals led outside the packaging material.

21. The electronic component of claim 18, wherein the projection has a thickness greater by not less than 0.2 mm than a thickness of the lead terminals led outside the packaging material.

22. The electronic component of claim 17, wherein the shielding section is an electrical insulating member provided on the packaging material between the terminal sections adjacent to each other.

23. The electronic component of claim 22, wherein the electrical insulating member has a greater thickness than a projecting amount of the lead terminals led outside the packaging material.

24. The electronic component of claim 22, wherein the electrical insulating member has a greater thickness than a thickness of the lead terminals led outside the packaging material.

25. The electronic component of claim 22, wherein the electrical insulating member is thicker by not less than 0.2 mm than a thickness of the lead terminals led outside the packaging material.

26. The electronic component of claim 17, wherein multi-layer capacitors comprising a single base having a plurality of pairs of terminal sections are used as the multi-layer capacitors.

27. The electronic component of claim 26, wherein one piece of the multi-layer capacitor comprising the single base having the plurality of pairs of terminal sections is packed in the packaging material.

28. An electronic component comprising:
a plurality of multi-layer capacitors, each of the capacitors including:
a dielectric base in which an interior electrode is buried;
a pair of terminal sections provided to the dielectric base;
a pair of lead terminals coupled to the pair of the terminal sections; and
a packaging material covering the plurality of multi-layer capacitors and a part of the lead terminals,
wherein a terminal distance expanding section is provided between the lead terminals adjacent to each other and led outside the packaging material.

29. The electronic component of claim 28, wherein the lead terminal distance expanding section has a greater space between the lead terminals adjacent to each other than a space between the lead terminals at a place led outside of the packaging material.

30. The electronic component of claim 28, wherein the lead terminal distance expanding section is a bent section provided to the lead terminals led outside the packaging material.

31. The electronic component of claim 28, wherein a space between lead terminals led outside of the packaging material is not shorter than 0.5 mm and not longer than 5 mm.

32. An electronic component comprising:
a first capacitor;
a second capacitor;
a first terminal coupled to the first capacitor;
a second terminal coupled to the first capacitor;
a third terminal coupled to the second capacitor;
a fourth terminal coupled to the second capacitor;
a package covering the first capacitor, the second capacitor, and a part of each of the first terminal, the second terminal, the third terminal, and the fourth terminal;
wherein at least a portion of the first terminal and a portion of the third terminal are disposed outside of the package;
wherein the portion of the first terminal and the portion of the third terminal that are disposed outside of the package are adjacent to one another; and
wherein the portion of the first terminal disposed outside of the package is insulated from the portion of the third terminal disposed outside of the package.

33. An electronic component according to claim 32, further comprising a non-conductive shielding section,
wherein the non-conductive shielding section is disposed so as to insulate the portion of the first terminal disposed outside of the package from the portion of the third terminal disposed outside of the package.

* * * * *